US008566386B2

(12) United States Patent
Courage et al.

(10) Patent No.: US 8,566,386 B2
(45) Date of Patent: Oct. 22, 2013

(54) LOGGING OF RICH ENTERTAINMENT PLATFORM SERVICE HISTORY FOR USE AS A COMMUNITY BUILDING TOOL

(75) Inventors: Michael R. Courage, Kirkland, WA (US); Jerry A. Johnson, Medina, WA (US); Brendan K. Reville, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1321 days.

(21) Appl. No.: 11/866,298

(22) Filed: Oct. 2, 2007

(65) Prior Publication Data

US 2009/0088254 A1 Apr. 2, 2009

(51) Int. Cl.
*G06F 15/16* (2006.01)

(52) U.S. Cl.
USPC ............... 709/202; 709/203; 709/204; 463/1; 463/42; 463/43; 463/29

(58) Field of Classification Search
USPC ............. 463/1, 42, 43, 29; 709/202, 203, 204
See application file for complete search history.

(56) References Cited

U.S. PATENT DOCUMENTS

| | | | | |
|---|---|---|---|---|
| 6,736,727 | B1 | 5/2004 | Doi et al. | 463/42 |
| 6,863,608 | B1 | 3/2005 | Lemay et al. | 463/24 |
| 7,099,798 | B2 * | 8/2006 | Yu et al. | 702/186 |
| 7,458,894 | B2 * | 12/2008 | Danieli et al. | 463/42 |
| 2002/0194269 | A1 * | 12/2002 | Owada et al. | 709/203 |
| 2003/0232650 | A1 * | 12/2003 | Beatty | 463/42 |
| 2004/0155903 | A1 * | 8/2004 | Schneeberg | 345/765 |
| 2006/0080613 | A1 | 4/2006 | Savant | 715/745 |
| 2006/0240894 | A1 * | 10/2006 | Andrews | 463/42 |
| 2007/0004507 | A1 * | 1/2007 | Nakajima et al. | 463/29 |
| 2007/0082738 | A1 * | 4/2007 | Fickie et al. | 463/42 |
| 2007/0143185 | A1 | 6/2007 | Harmon et al. | 705/14 |
| 2007/0156805 | A1 | 7/2007 | Bristol et al. | 709/202 |
| 2007/0207846 | A1 * | 9/2007 | Burak et al. | 463/9 |
| 2008/0294607 | A1 * | 11/2008 | Partovi et al. | 707/3 |
| 2009/0089803 | A1 * | 4/2009 | Biggs | 719/318 |

FOREIGN PATENT DOCUMENTS

WO   WO 2005/093598   10/2005

OTHER PUBLICATIONS

Halper et al., "Action Summary for Computer Games: Extracting Action for Spectator Modes and Summaries," *Proceedings of 2nd International Conference on Application and Development of Computer Games*, Hong Kong, China, http://wwwisg.cs.uni-magdeburg.de/graphik/pub/files/Halper_2003_ASF.pdf, Jan. 6-7, 2003, 124-132.

(Continued)

*Primary Examiner* — Thuong Nguyen
(74) *Attorney, Agent, or Firm* — Woodcock Washburn, LLP

(57) ABSTRACT

Systems, methods, and computer readable media are disclosed for aggregating event records obtained from a plurality of videogame consoles, and generating event objects for each event record of the plurality. Additionally, the event objects can be stored in a database that is exposed to a third party via a connection to a network such as the Internet. In addition to the foregoing, other aspects are described in the claims, drawings, and text forming a part of the present disclosure.

7 Claims, 4 Drawing Sheets

(56) References Cited

OTHER PUBLICATIONS

Hahsler et al., "Cooperation and Disruptive Behaviour-Learning From a Multi-Player Internet Gaming Community," *Proc IADIS, Int'l Conf. Web Based Communities,* Lisbon, Portugal, http://wwwai.wu-wien.ac.at/~hahsler/research/webBasedComm_cs/web-BasedComm_cs.pdf, Mar. 24-26, 2004, preprint, 1-8.

Kester et al., "Facilitating community building in Learning Networks through peer tutoring in ad hoc transient communities," http://dspace.ou.nl/bitstream/1820/609/4/Facilitating+Community+Building+titlepage.pdf, downloaded 2007, preprint, 15 pages.

* cited by examiner

LOGGING OF RICH ENTERTAINMENT PLATFORM SERVICE HISTORY FOR USE AS A COMMUNITY BUILDING TOOL

BACKGROUND

Online social networking continues to explode and become a primary activity for a growing number of people. Generally, these people write about the things they find interesting, display pictures of family and friends, and write about the content they enjoy such as movies, music, and videogames. People are generally limited in what they can post though, for example, a person can write about how they earned an achievement in a videogame, however this requires that the person go through a lengthy editing process. The person can obtain the information about how they performed in a videogame from some sources like a website maintained by the developer of the game, however, if a videogame developer does make this information accessible, or provide it in a manageable format, the person will not be able to integrate this information into their webpage.

SUMMARY

In an example embodiment of the present disclosure, a method is provided that includes, but is not limited to, receiving, from a plurality of videogame consoles, a plurality of event records, wherein each event record of the plurality of event records includes information describing one of a plurality of events conforming to one of a plurality of schemas; generating, for a first event record that includes information describing a first event according to a first schema, a first event object that includes information describing the first event, wherein the information describing the first event in the first event object conforms to a common schema defined by a service provider; generating, for a second event record that includes information describing a second event according to a second schema, a second event object that includes information describing the second event, wherein the information describing the second event in the second event object conforms to the common schema; generating, entries for the first and second event objects in a database, wherein the database includes a plurality of event objects; and exposing, to an entity different from the service provider, an interface to the database. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects; the circuitry and/or programming can be virtually any combination of hardware, software, and/or firmware configured to effect the herein-referenced aspects depending upon the design choices of the system designer.

In another embodiment of the present disclosure, a system includes, but is not limited to, a process configured to query a database that includes a plurality of event objects for a first and second event object, wherein the first event object includes information describing a first event conforming to a common schema, said first event object generated from a first event record including the first information conforming to a first schema, and the second event object includes information describing a second event conforming to the common schema, said second event object generated from a second event record including the second information conforming to a second schema; a process configured to receive the queried first and second event objects; and a process configured to display the queried first and second event objects. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced processes; the circuitry and/or programming can be virtually any combination of hardware, software, and/or firmware configured to effect the herein-referenced processes depending upon the design choices of the system designer.

In another embodiment of the present disclosure, a computer readable storage medium including computer readable instructions for converting records obtained from a plurality of videogame consoles into a common format is provided where the computer readable medium includes, but is not limited to, instructions for receiving a plurality of event records, wherein each event record of the plurality includes information describing one of a plurality of events, and the information describing one of the plurality of events conforms to one of a plurality of schemas; instructions for identifying a schema selected from a plurality of schemas that describes one of the plurality of events for each event record of the plurality of event records; instructions for using the schema identified for each event record to generate an event object, wherein each event object includes the information describing one of the plurality of events, and the information describing one of the plurality of events conforms to a common schema; instructions for creating entries in a database for each event object generated, wherein the database includes a plurality of event objects; and instructions for exposing, to an entity different from the service provider, an interface to the database. In addition to the foregoing, other system aspects are described in the claims, drawings, and text forming a part of the present application.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION OF ILLUSTRATIVE EMBODIMENTS

Figure 1:
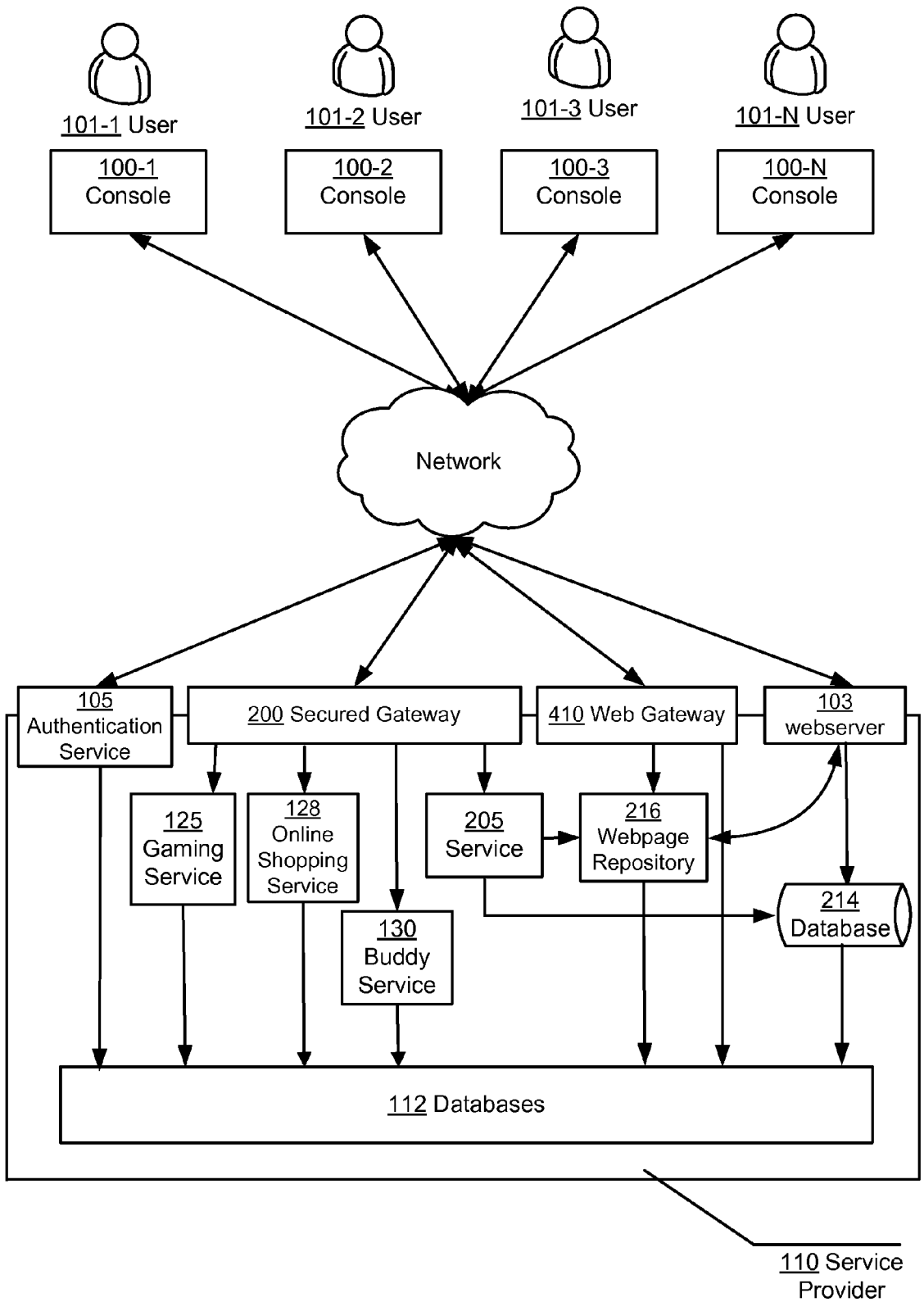
FIG. 1 illustrates an example system wherein aspects of the present disclosure can be implemented.

Referring now to FIG. 1, it generally depicts an operational environment for practicing aspects of the present disclosure. One skilled in the art will note that the example elements depicted in FIG. 1 are provided to depict an example operational context, and thus, the example operational context is to be treated as illustrative only, and in no way limit the scope of the claims.

As shown by FIG. 1, it depicts a plurality of consoles 100-1 through 100-N (where N is an integer greater than 1). In some example embodiments, a console can be a videogame console configured to play movies, videogames, music, etc. In some embodiments, a videogame console can be a hand held device such as a portable videogame device, a cellular phone configured to play games or movies, or in other embodiments it can be a computing system coupled to a TV. As shown in FIG. 1, in some example implementations, each console 100-1 through 100-N can be associated with a user such as user 101-1 through 101-N. For example, a user can be considered associated with a particular console if they provide valid credentials to the console. For example, a user, user 101-1, can turn on their console 100-1, and be provided with a welcome screen. The user 101-1 can enter credentials such as a user name and password, and the console 100-1 can connect to the service provider 110 via a network connection. An authentication service 105, of a service provider 110 can be configured to authenticate the credentials using one of a plurality of authentication techniques. In this example, each console may include a machine code that identifies the console. Once the user's account is created, it can be stored in a database 112 that includes information that associates the user 101-1 to the machine code of the console 100-1 they logged in from.

Continuing with the description of FIG. 1, once the user, user 101-1 for example, creates an account with a service provider 110 they can access one or more services maintained by the service provider 110. Generally, some of these services may include, but are not limited to, services such as gaming services 125, buddy services 130, online shopping services 128, and services described in the present disclosure.

As briefly stated above, one example service that can be offered to users is an online shopping service 128. In some example embodiments, the online shopping service 128 can be configured to provide a catalog of purchasable content. In some example situations, content can include but is not limited to, movies, videogames, music, or user created content such as pictures, or content for videogames, e.g., virtual items and goods. Generally, content in some embodiments can include any electronic media, and the disclosure is not limited to the example content describe above. In different implementations, the service provider 110 can configure the online shopping service 128 to service a verity of requests from users, e.g., the online shopping service 128 can be configured to allow users themselves to buy and sell electronic content. The content sold by the online shopping service 128 can be similar to the content that users can purchase in stores. For example, the service provider 110 can sell a videogame that a user can download via the online store 128, and sell the same, or a substantially similar version of the videogame in a physical store. In this way, the service provider 110 can take advantage of traditional distribution methods and provide online shopping services for users that do not want to make purchases at physical stores.

As depicted by FIG. 1, in some example embodiments the service provider 110 can provide a gaming service 125. For example, a gaming service 125 can include one or more game servers configured to host videogames. For example, in some instances a videogame can have an online component. In these instances, at least one server in the gaming service 125 can include any hardware, software, or a combination thereof in order to accept connections from users, and allow them to play each other. More specifically, a gaming service 125 in some embodiments can be multiple game servers, i.e., one or more servers for each type of game, configured to allow users 101-1 through 101-N to connect and play each other. The type of online play depends on the game. For example, a sports game may only allow 2 people to play, one person per team, while a first person shooter game can be configured to allow 64 people to play each other. In some implementations, the physical server configured to host the games may be maintained by the developer of the videogame. In this instance, a user can connect through the service provider's interface to the gaming service 125. In this manner, the service provider 110 can still be involved in at least a portion of the online gaming experience.

Continuing with the example, the service provider 110 can in some embodiments provide additional services such as a buddy service 130. The service can allow users to befriend each other online. For example, if a user 101-1 plays with user 101-2 a couple times and enjoys the games, they can invite the user 101-2 to become a buddy. If user 101-2 accepts, then they can send each other text messages, receive presence information such as information that indicates when one logs onto the system, or starts playing a game on their console.

Continuing with the description of FIG. 1, it additionally depicts a webserver 103, and a webpage repository 216. In some embodiments, the webserver 103 can allow people outside of the internal network to access one or more webpages. For example, the webserver 103 can in some embodiments accept HTTP request from a network such as the Internet, and provide HTTP responses by fetching any webpages stored in repository 216 identified by the request. The requests can be for HTML documents, and in some embodiments, the content of the documents can be the same or substantially similar to the content of the pages offered by the online shopping service 128. In other embodiments of the present disclosure, the webserver 103 can host webpages that depict snapshots of events transpiring within one or more of the gaming servers 125. For example, a first person shooter game can keep track of how many kills users accumulates in a game, this data can be depicted on one or more webpages that are devoted to the game.

Figure 2:
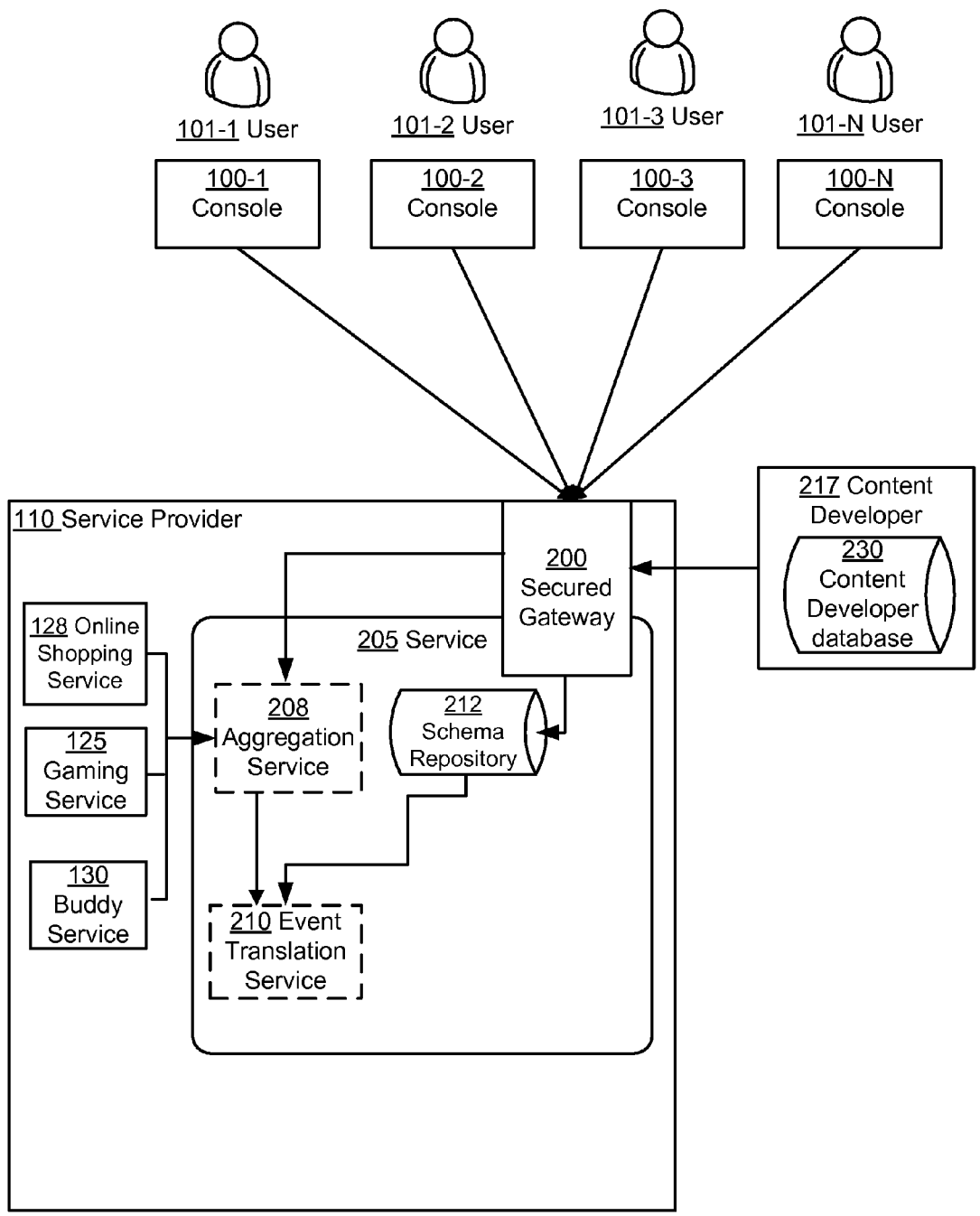
FIG. 2 illustrates an example system wherein aspects of the present disclosure can be implemented.

Referring now to FIG. 2, it depicts an operational environment for practicing aspects of the present disclosure at a lower level of detail than FIG. 1. More specifically, FIG. 2 shows a blown up example of a service 205. Similar to that above, one skilled in the art will note that the example elements depicted in FIG. 2 are provided to depict an example operational context and thus, the example operational context is to be treated as illustrative only and in no way limit the scope of the claims.

Similar to that describe above, FIG. 2 shows multiple users 101-1 through 101-N each associated with a console 100-1 through 100-N. In this example, the consoles 100-1 through 100-N can connect via a packet based network to the secured gateway 200 while the associated user, user 101-1 for example, is interacting with content displayed on their console 100-1. In some instances, this information can conform to a transmission protocol such as the universal datagram protocol, the transmission control protocol, or another protocol, the selection of the protocol depends on whether an administer of the system wants guaranteed reliability. The information transmitted to the secured gateway 200 can, for example, include presence information. In this example, presence information can include information that identifies whether the user is online, or offline, and what they are doing with their console. More specifically, in some embodiments console 100-1 can be configured to transmit packets of information over the network whenever user 101-1, plays a movie, listens to music, views pictures, or plays a videogame. In some implementations, the one or more packets can include even more specific information such as the level the user 101-1 is playing in the game, or even how many times the user 101-1 has pressed a button on their controller. In this example, the user 101-1 can be playing their game on their console by themselves, with a friend, or they can be connected to gaming service 125 playing multiple users, e.g., user 101-2 through 101-N.

Continuing with the general description of FIG. 2, it additionally depicts a service 205 that can include, but is not limited to, an aggregation service 208, an event translation service 210, a schema repository 212, and a database 214. One skilled in the art will note that elements 208 and 210 are indicated in dashed lines, which is indicative of the fact that they are considered optionally located at their respective position in FIG. 2, and that each service (208 and 210) can be distributed, e.g., implemented by a plurality of processes, threads, or servers. One skilled in the art can also appreciate that elements 208 and 210 are described herein as separate elements for clarity purposes, and that the disclosure is not limited to embodiments where separate services perform the functions described. More specifically, while elements 208 and 210 are depicted, and described, as separate, one or more of them can be embodied in the same hardware, software, and/or firmware, i.e., in some embodiments an aggregation service 208 may be part of the same process, circuitry, or a combination of hardware and software, as the event translation service 210.

Referring now to the aggregation service 208 of FIG. 2. For example an aggregation service 208, of a service 205, can be configured to receive data from a plurality of consoles, for example consoles 100-1 through 100-N via a secured gateway 200, or from any other service of the service provider 110 such as online shopping service 128, gaming service 125, and/or buddy service 130. For example, in certain embodiments of the present disclosure, data received from one of the sources describe above can be considered an event record, e.g., a data package that describes the occurrence of an event. For example, in one implementation, everything that a user 101-1 does with their console 100-1 could be considered an event as long as a rule defining it as an event exists, e.g., pushing a button could be an event if a rule describes pushing the button as an event, turning on the console 100-1 could be another event if another rule describes turning on the console as an event, etc. Each event record can describe the corresponding event in sufficient detail so that the service provider 110 can process the record, and understand what happened, i.e., the record could include information indicating what the event was (action button pushed), who pushed it (user 101-1), and what time it was pushed (Dec. 1, 2007 at 5:45:21 pm).

In order to accurately describe an event, a rule must exist defining how the console, service, or videogame, can determine whether it occurred, and a schema for the event record must exist in order for the console, service, or videogame, to accurately describe it, e.g., the console, services, or videogame, need to know how format event records for transmission to the service provider 110. Generally, a schema can be a description of an event record that provides a view of the event record at a high level of abstraction. A schema can in some embodiments define a record's structure, i.e., what elements, attributes, or types are included in the record, and which elements are children of others, the order the child elements can appear, and the number of acceptable child elements. Schemas can specify if an element is empty, if it can include text, and how to describe allowable elements, attributes, and relationships. More specifically, a schema for a specific event record can provide the framework for the event record.

In some example implementations, an administrator of the service provider 110 can define what events they want the consoles, and services such as 125, 128, and/or 130 to track by defining events, rules associated with the events, generating schemas for the event records, and transmitting this information to the services (i.e., services 125, 128, and/or 130), and consoles 100-1 through 100-N. Thus, if a defined event occurs, a record of the event can be generated, and sent to the aggregation service 208 of the service provider 110. In a specific example, the service provider 110 can define an event "Buying a New Movie," generate a schema for records describing buying a movie, and create a triggering rule that states buys a movie is an event. In the instance that a user, user 101-1 for example, purchases a new movie from online shopping service 128, the condition associated with the event will be satisfied, and the online shopping service 128 can generate an event record using the provided schema, and transmit the event record to the aggregation service 208. Some of the information included in such a record could, for example, identify the event, the time the event occurred, and the user associated with the occurrence of the event.

In some embodiments, the rules that define events, and the schemas associated with the events may not be developed by an administrator of the service provider 110, but by a content developer 217, i.e., an entity separate from the service provider 110 that develops content to be used in conjunction with the consoles 100-1 through 100-N such as a videogame developer. In these, and other embodiments, the content developer 217 can program events, the rules associated with the event, and the schemas for generating event records into the content itself. For example, a content developer 217, such as a videogame producer, may insert achievements into their game and code the achievements according to their own unique schema. A user can then play the game, and earn the achievements as they progress. The user 101-1, may then invite friends over, load the videogame into the memory of the console 100-1, and the console 100-1 can access the data to display any achievements the user 101-1 has earned. More specifically, a football game developer can encode an event into a game named "Best Quarterback Achievement" with a rule that defines throwing 8 touchdown passes in a game as the triggering condition. If, for example, the user 101-1 is able to throw 8 touchdown passes in a game, then the console 100-1 can generate an event record according to the schema provided by the content developer 217, and either store the record on the console, or transmit the record to a server maintained by the content developer 217. In this example, the aggregation service 208 can be configured to receive a copy of the event record alternatively, or in addition to, any event record transmitted to the content developer 217. In another example, a music CD producer could encode an event such as "Biggest Fan" that has a condition associated with the event requiring that the user purchase every CD by the musical group, and play every song on their console 100-1. If, for example, the user 101-1 purchases all the CDs by a specific group and plays them, then an event record can be generated and transmitted to the aggregation service 208.

In some embodiments of the present disclosure, the aggregation service 208 can be configured to receive event records defined by game developers from a gaming service 125. For example, the user 101-1 can be playing a plurality of buddies 101-2 through 101-N in a Football game connected to the gaming service 125. If the user 101-1 throws 8 touchdown passes against his buddies, the gaming service 125 can generate an event record describing the event and transmit it to the aggregation service 208.

Since content developers are free to encode rules, and events, into their content as they see fit, naturally each event record that the aggregation service 208 receives could conform to one of a plurality of schemas, i.e., the schema a videogame developer creates to describe an achievement can be different from a schema developed by another videogame producer to describe a different achievement. Or put another way, each event record can, in some embodiments, conform to a different schema, because, for example, they may include different elements and attributes, or each event record could be created by a different entity using their own way of defining an event. More specifically, an event record for playing a movie ten times as an event can contain different information than an event record describing an event such as progressing to the next level in a videogame.

Figure 3:
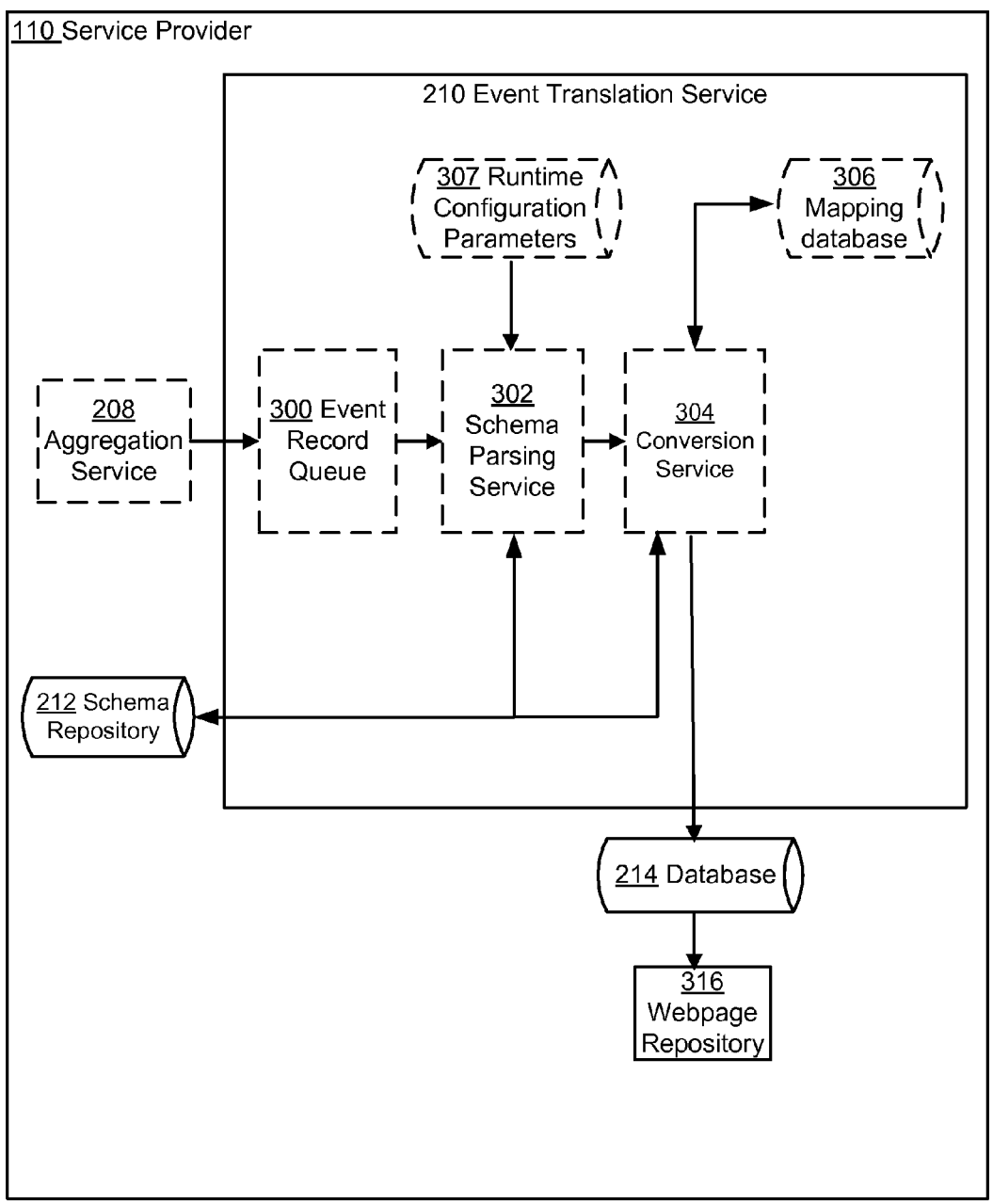
FIG. 3 illustrates an example system wherein aspects of the present disclosure can be implemented.

Referring now to FIG. 3, it depicts an example event translation service 210 of the present disclosure at a higher level of detail than in FIG. 2. In this example, implementation, the event translation service 210 can include, but is not limited to, an event record queue 300, a schema parsing service 302, a conversion service 304, and a mapping database 306. One skilled in the art will note that elements 300, 302, 304, and 306 are indicated in dashed lines, which is indicative of the fact that they are considered optionally located at their respective positions in FIG. 3, i.e., the mapping database 306 and the event record queue 300 can in some embodiments be located elsewhere, and each service (302 and 304) can be distributed, e.g., implemented by a plurality of processes, threads, or servers. One skilled in the art can also appreciate that elements 302 and 304 are described herein as separate elements for clarity purposes, and that the disclosure is not limited to embodiments where separate services perform the functions described. More specifically, while elements 302 and 304 are depicted, and described, as separate, one or more of them can be embodied in the same hardware, software, and/or firmware, e.g., in some embodiments a schema parsing service 302 may be part of the same process, circuitry, or a combination of hardware and software, as the conversion 304.

Continuing with the description of FIG. 3, once the event records are received by the aggregation service 208, in some implementations the records can be stored in an event record queue 300. For example, an event record queue in some embodiments can simply be a database that stores each event record as it is received along with a timestamp. In other implementations, the event record queue 300 can be non-persistent storage, e.g., RAM. Additionally, in some implementations metadata that identifies where the record came from, e.g., what console, or service, transmitted the record can be stored in the queue.

Continuing with the example, a schema parser 302 of an event translation service 210 can be coupled to the event record queue 300, and it can be configured to determine what schema describes the information in each record. More specifically, the information in each record of the plurality of records can conform to one of a plurality of schemas defined by the entity that developed the content, and the schema parsing service 302 can be configured to determine which schema of the plurality accurately describes the information in each record. This can be accomplished, in some embodiments, by analyzing each event record as it is received. For example, the schema parsing service 302 can scan a header of an event record to determine the appropriate schema. In this implementation, each record could have an identification number stored in the header that identifies what schema the record uses, and the schema parsing service 302 can perform an operation to lookup the corresponding schema stored in the schema repository 212 (the schema could have provided to the schema developer from the content developer). In another implementation, the schema parser 302 can be configured to scan an event record to identify the elements, attributes, data types, and relationships in the record, and use this information to infer what schema describes the information in the record. For example, the schema parser 302 can call a procedure, or method, to scan each line in an event record to obtain a general picture of event record's structure, and access the schema repository 212 to determine whether there are any schemas that match the records general structure. If there is a match, e.g., if there is a 100% match, or a match within a predetermined range indicating that a match is likely, the schema parsing service 302 can be programmed to infer that the matching schema is appropriate for the event record. Additionally, or alternatively, in some embodiments, a hash of the event record can be generated, and compared to the hash values of the schemas in the repository 302. If the hash values match, then the schema parsing service 302 can be programmed to infer that the schema is applicable to the record.

In some example embodiments of the present disclosure, the order that each record is parsed can be configured by an administrator, and/or a user of the service 205. For example, the schema parser 302 can be configured to parse event records conforming to a certain schema before event records conforming to other schemas. For example, in some instances, an administrator may configure the system to convert event records indicative of transactions at the online shopping service 128 after event records obtained from consoles 101-1 through 100-N. In this example, the administrator can modify the runtime configuration parameters 307 of the schema parsing service 302 to direct it to devote more translation processing time to event records obtained from certain places. In another embodiment, the schema parsing service 302 can be configured to identify matching schemas for event records, and then prioritize the order that the records are converted by the conversion service 304. For example, in some embodiments, a user may have access to a website maintained by the webserver 103 of FIG. 1 that allows them to specify what kind of event records they want the translation service 210 to prioritize. The webserver 103 can modify a user preferences stored in runtime configuration parameters 307 of FIG. 3. The parsing service 302 can then access the runtime configuration parameters 307 and determine whether to prioritize the order at which the conversion service 304 converts certain event records for certain users over other event records for the same user. A specific example may include, a user 101-1 that is interested in having event records associated with their buddy list processed before records associated with a shooter game they play. The user may access a website and adjust a slider that allows the user to adjust the rate of processing buddy list event records vs. shooter game event records and click 'save.' The webserver maintaining the website can transmit one or more packets of information indicative of the change to the runtime configuration parameters 307 associated with the schema parser 302. The schema parser 302 can in this example then identify a record associated with the buddy list of the user, and identify a record associated with the shooter game. The schema parser 302 can then place the record associated with the buddy list ahead of the record associated with the shooter game so that the buddy list event record will be processed before the shooter game record.

Referring to FIG. 3, in some embodiments, once the schema parser 302 obtains the appropriate schema for an event record, it can supply the record, along with a signal indicative of the appropriate schema, to a conversion service 304. In this implementation, the conversion service 304 can be configured to generate an event object that includes the information in an event record by for example, creating a new object separate from the event record, and storing reformatted data in the object, or by reformatting the event record into an event object that includes reformatted data. The reformatted data stored in a generated event object can conform to a common schema, e.g., a schema that other event objects in a database 214 use. For example, if two event records were received, and the data in the two records conform to different schemas, the conversion service 304 can convert the information from both of the event records into event objects that include information conforming to a common schema, or in another embodiments the conversion service 304 can convert the information from the second event record into information conforming to the schema used by the first event record.

In this example embodiment, the conversion service 304 can convert event records into event objects by using mapping relationships stored in a mapping database 306. For example, a mapping database 306 in some embodiments can be a relational database, an object oriented database, or even a column oriented database. This mapping database 306 can include entries for each schema, and a list of possible elements. The mapping database 306 can additionally include relationships from each element in each schema, to an element in the common schema. A specific example can include, a conversion service 304 that is configured to receive an event record including an element such as "game name" and an attribute identifying the name of the videogame the record is for. The conversion service 304 can find the element "game name" in the mapping database 306 and determine, for example, that the element corresponding to "game name" in the common schema is "title ID." The conversion service 304 can then generate an event object that includes an element "title ID."

In addition, the conversion service 304 can convert attributes associated with an element in an event record, to an attributes conforming to the common schema. In this example, the mapping database 306 can include, for each element in a schema, a list of possible attributes that can be associated with a specific element. More specifically, an element in an event record such as "game name" could have one of a plurality of valid attributes based on how many games the developer makes. The mapping database 306 can include relationships from each possible attribute, to an attribute according to the common schema. More specifically, if the "game name" element includes an attribute "100" of the type int, the conversion service 304 can identify the element "game name" in the mapping database 306 is convertible to the element "title ID" in the common schema, and the attribute "100" is convertible to "Action Game XYZ" of the type string in the common schema.

In some embodiments, the conversion service 304 can be configured to add information to an event object when it is generated. For example, in some embodiments, an event record may not include all the information that the service provider 110 would like. In these, and other, situations the conversion service 304 can add such information to an event object. For example, an event record for a game may not include the time that the event occurred. In this case, the conversion service 304 can use the time that the aggregation service 208 logged the event record as the time it was earned, and add this information to the event object. Another example may include adding graphic files to an event object that can be rendered on a user interface. For example, if an event includes an achievement such as a gold medal, the event object can include a graphic for the medal. In addition, if the event is associated with a specific user, the object can include a graphic that represents the user such as the user's avatar.

In another example implementation, the conversion service 304 can use the elements, and associated attributes, to link an event object to one or more webpages associated with the information in the object. For example, in some embodiments, the conversion service 304 can access the mapping database 306, and the mapping database 306 can include relationships from certain attributes to webpages that include information associated with the attributes, and add hypertext links for the webpages to event objects. In some embodiments, the hypertext links for the webpages can be generated by a system administrator, and stored in a webpage repository 316. For example, an event object can include information such as title ID=Action Game XYZ, achievement earned=shot down 10 aircraft, weapon=rocket launcher, user=player25, etc. In this example, one or all of the example attributes can be associated with webpages, and the conversion service 304 can include the hypertext links that describe the game, the achievement, the weapon used, and the user. More specifically, an event object generated in this example can include multiple links to multiple websites that include information associated with the attributes.

Figure 4:
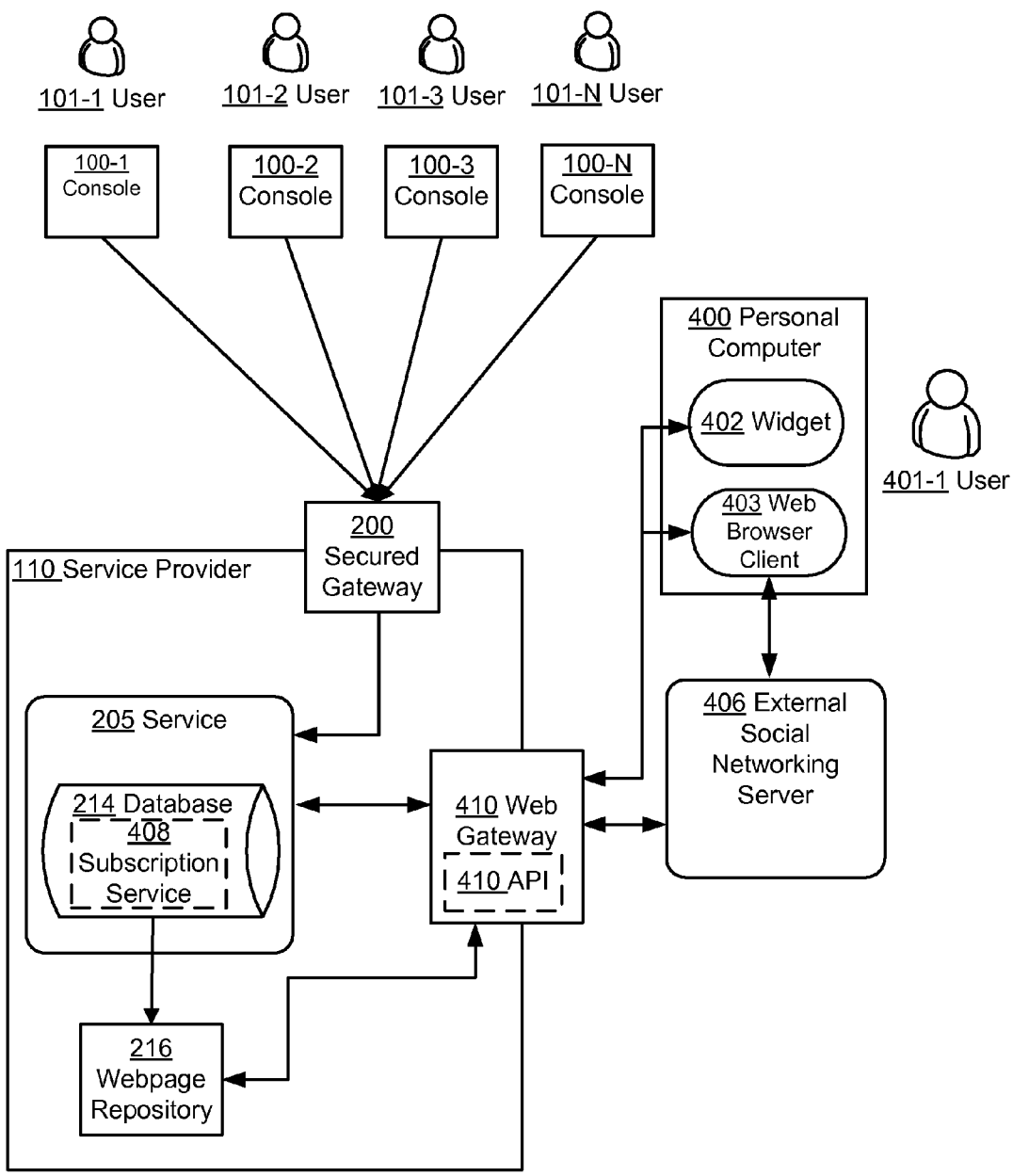
FIG. 4 illustrates an example system wherein aspects of the present disclosure can be implemented.

Referring now to FIG. 4, it generally depicts elements similar to those of FIG. 2, and example operational elements 400, 401-1, 402, 403, 406, 408, and 410. Generally, in some embodiments, the database 214 that includes event objects can be exposed to one, or more, third party entities via a connection to an external network such as the Internet. In these embodiments, the database 214 can be configured to receive requests from entities different from the service provider 110, and transmit one or more event objects to them.

In an embodiment, an entity different from the service provider 100, can be a social networking server 406 of FIG. 4. In this example, the social networking server 406 can be configured to interface with the database 214 via the web gateway 410. In some situations, a social networking server 406 can include an online community where users can create their own webpages, and upload their own content. The server 406 can provide the information in response to requests from users, generally in the form of HTML webpages. In some embodiments of the present disclosure, a user can create a webpage on a social networking website maintained by the social networking server 406, and query the database 214 for information that can be stored in one or more of the event objects. For example, in the instance that a user wants to devote a section of his, or her, webpage to the achievements earned by his, or her, buddies, the user can access their page via a web browser client 403 of a personal computer 400, and can submit a query to the web gateway 410 for objects according to one or more query parameters such as the names of the buddies, the time frame the user is interested in, the name of the videogame, and the names of the achievements. The API 410 coupled to the web gateway 410 can receive the request, and search the database 214 for event objects that meet the specified parameters. More specifically, user 401-1 may be interested in displaying all the achievements user 101-1 earned in a Football game XYZ over the weekend. The user 401-1 can configure he social networking website to query the database 214 via the API 410, and request all achievement related event objects for user 101-1 in Football game XYZ. User 401-1 can then arrange the objects as he, or she, wants on their webpage, e.g., the event objects can be embedded in the social networking webpage, and for example, the objects can have pictures associated with the achievements that include hypertext links to webpages that include additional related information about the picture in the event object.

In another embodiment of the present disclosure, the user 401-1 can develop a widget 402, or a program embedded in the desktop screen of their personal computer 400. For example, in some embodiments a personal computer 400 can include, but is not limited to, a desktop computer, a mobile phone, a PDA, a personal music player, or any other device that can access information from a network such as the Internet. In this example embodiment, the user 401-1 can query the database 214, and receive one or more event objects that meet the criteria in the query. The widget 402 can then be configured to reformat the information, aggregate it, use it to plot graphs, or do any number of unique and creative things with it to display the data in the objects. For example, the user 401-1 can in some instances want to obtain information about how many times he, or she, has beaten his, or her, buddies in a certain shooter game. The API 410 can query for this information, and send a copy of any event objects that contain applicable information to the personal computer 400. The user 401-1, for example, may want to create a bar graph using the widget 402 that plots how many times he, or she, has beaten his or her buddies verses time.

Continuing with the description of FIG. 4, it additionally depicts a subscription service 408. For example, in some embodiments of the present disclosure, the database 214 can include a service that allows users to subscribe to notifications based on predetermined criteria. For example, a user 401-1 can be interested in receiving notifications when certain events occur. The user 401-1 can access a website via the web browser 403 of personal computer 400 that contains a graphical user interface, and specify the type of events they want notifications for. In some instances, this could include a user specifying that they want to know about any movies, games, or music, purchased by one of their buddies. In this example, when an event object associated with one of the user's buddies describing purchasing a new game, song, or movie, is stored in the database 214, the subscription service 408 can detect it, and send the event object, or objects, to the widget 402, social networking website 406, or any other system that has been configured to receive event objects.

A specific example of this may include a user 401-1 that is interested in knowing if any of his friends ever earn the achievement "top gun" in a flight simulator videogame. In this example, the user may log onto a webpage maintained by the webserver 103 of FIG. 1, and configure their account to receive a notification if anyone listed as one of his buddies ever earns this award. If, for example, his buddy, user 101-1, earns the achievement, their console can send a packet indicative of an event record describing that user 101-1 earned the "top gun" achievement to the secured gateway 200. The service 205 can convert the record into an event object, and store it in the database 214. The subscription service 408 can detect that a new object has been stored, and determine if there are any notification rules applicable to this event object. In this example, the subscription service 408 can invoke a procedure, or method, to transmit a copy of the event object, to the mobile phone 400 associated with the user 401-1 since the object meets criteria specified by the user.

In some embodiments, certain event objects can be related to other event objects that describe similar events. In this example, if the user queries the database 214 for an object, the API 410 can obtain any objects related to the queried object, and return those to the machine requesting the information. For example, since each event object contains information about a specific event, this information may be to detailed in order to give user 401-1 a manageable view of the data, thus, in some embodiments, the API 410 can be configured to retrieve information across multiple related event objects to provide a more user friendly view of the information stored in the database 214.

As described above, in some embodiments each event object can include a hypertext link to one or more webpages that describe information related to the event. For example, an event object can include information such as title ID=Action Game XYZ, achievement earned=shot down 10 aircraft, weapon=rocket launcher, user=player25, etc. In this example, one or all of the example attributes can be associated with webpages. If, for example, user 401-1 receives this event object and embeds it in a webpage, the object can include multiple graphics, e.g., a graphic for the user, for the achievement, for the game, for the weapon, etc. Each one of these graphics can include a hypertext link to a webpage associated with an attribute of the event object. In the instance that any user views the object, they can click on one, or more portions of it, and a webpage associated with each attribute can be downloaded and rendered. More specifically, if a user, views the object in a browser 403 of a personal computer 400, and clicks on the graphic associated with the rocket launcher, a webpage that includes information about the rocket launcher can be rendered in the browser 403, or if a user clicks on a graphic associated with the player, a webpage with information about the player can be rendered in the browser 403. This webpage, can include links to other objects, for example, links to other users that have earned the achievement, information about the buddies of the user, information about what games the user just bought, information about whether the user is online, or any other information that can be captured in an event object.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A method comprising:
  receiving, from a videogame console, a plurality of event records, each event record of the plurality of event records including information describing one of a plurality of events;
  determining that the plurality of events matches specified events related to a buddy user account identified with a first user account, wherein the buddy user account comprises a user account authorized by invitation by the first user account to have access to information associated with the first user account; and
  responsive to the matched specified events,
    plotting a graph based on the matched specified events, wherein the plotted graphic is included in a notification, and
    automatically providing the notification regarding the matched specified events to a social network account associated with the first user account, wherein the matched specified events include information describing an achievement in a videogame.

2. The method of claim 1, further comprising querying for the matched specified events using a mobile phone, the mobile phone used for the plotting of the graph based on the matched specified events.

3. The method of claim 1, further comprising:
generating a link including an address of a webpage that includes information associated with information describing the matched specified events.

4. A tangible computer readable storage including computer readable instructions stored thereon for converting records obtained from a plurality of videogame consoles into a common format, the instructions when executed by a processor that is communicatively connected to the computer readable storage perform a method comprising:
receiving, from a videogame console, a plurality of event records, each event record of the plurality of event records including information describing one of a plurality of events;
determining that the plurality of events matches specified events related to a buddy user account identified with a first user account, wherein the buddy user account comprises a user account authorized by invitation by the first user account to have access to information associated with the first user account; and
responsive to the matched specified events,
providing instructions to plot a graph based on the matched specified events, wherein the plotted graphic is included in a notification, and
automatically providing the notification regarding the matched specified events to a social network account associated with the first user account, wherein the matched specified events include information describing an achievement in a videogame.

5. The computer readable storage of claim 4, further comprising instructions:
generating a link including an address of a webpage that includes information associated with information describing the matched specified events.

6. A device for displaying information obtained from videogame consoles, comprising:
a processor; and
a memory coupled to the processor, the memory having stored thereon executable instructions that when executed by the processor cause the processor to effectuate operations comprising:
receiving, from a videogame console, a plurality of event records, each event record of the plurality of event records including information describing one of a plurality of events;
determining that the plurality of events matches specified events related to a buddy user account identified with a first user account, wherein the buddy user account comprises a user account authorized by invitation by the first user account to have access to information associated with the first user account;
responsive to the matched specified events,
providing instructions to plot a graph based on the matched specified events, wherein the plotted graphic is included in a notification, and
automatically providing the notification regarding the matched specified events to a social network account associated with the first user account, wherein the matched specified events include information describing an achievement in a videogame.

7. The device of claim 6, further comprising instructions:
generating a link including an address of a webpage that includes information associated with information describing the matched specified events.

\* \* \* \* \*